United States Patent [19]

Blaha et al.

[11] Patent Number: 4,826,619

[45] Date of Patent: May 2, 1989

[54] STARCH SLURRIES WITH CONCENTRATED AQUEOUS ALKALINE SOLUTIONS

[75] Inventors: James S. Blaha; Henry W. Elceser, both of Decatur; Leonard F. Vander Burgh, Bethany, all of Ill.

[73] Assignee: A. E. Staley Manufacturing Company, Decatur, Ill.

[21] Appl. No.: 128,294

[22] Filed: Dec. 3, 1987

[51] Int. Cl.$^4$ .............................................. C09K 3/00
[52] U.S. Cl. .......................... 252/182.27; 252/182.14
[58] Field of Search ....................... 252/182.27, 182.14

[56] References Cited

U.S. PATENT DOCUMENTS

| | | | |
|---|---|---|---|
| 2,920,124 | 1/1960 | Stiles et al. | 260/683.59 |
| 2,955,924 | 10/1960 | Smith | 23/285 |
| 3,193,257 | 7/1965 | Kingma | 259/4 |
| 3,523,299 | 8/1970 | Paige et al. | 260/80.78 |
| 3,632,803 | 1/1972 | Hjermstad et al. | 260/233.3 |
| 4,501,887 | 2/1985 | Kornrumpf et al. | 252/182.27 |

FOREIGN PATENT DOCUMENTS 741742 12/1955 United Kingdom .

OTHER PUBLICATIONS

Article by Harry W. Leach entitled "Gelatinization of Starch in Caustic Alkali" Adhesives Age, Sep. 1962, pp. 20 & 21.
Article by Sterbacek et al. entitled "Mixing in the Chemical Industry" pp. 272 and 273.

*Primary Examiner*—Edward A. Miller
*Attorney, Agent, or Firm*—Michael F. Campbell; J. Daniel Wood

[57] ABSTRACT

Concentrated aqueous alkaline solutions containing about 10 weight percent or more of a water soluble alkaline reagent such as sodium hydroxide, potassium hydroxide, etc. are admixed with aqueous granular starch slurries without pasting or swelling the granular starch material to an unacceptable degree by introducing a metered stream of said alkaline solution into a flowing stream of said starch slurry at or near the inlet of an intensive, in-line mixer which completely and homogeneously mixes said streams within a time period of less than 1 second.

17 Claims, No Drawings

STARCH SLURRIES WITH CONCENTRATED AQUEOUS ALKALINE SOLUTIONS

BACKGROUND OF THE INVENTION

The present invention pertains generally to the treatment of aqueous starch compositions with alkaline materials and, in particular, to a method of admixing aqueous granular starch slurries with relatively concentrated aqueous alkaline solutions without pasting the granular starch material and without swelling said granular starch material to such a degree that it becomes essentially unfilterable.

The preparation of etherified starch derivatives in non-gelatinized, granular form has been known and practiced for many, many years. As a specific example, it has long been known to produce hydroxyalkylated (e.g., hydroxyethylated) granular starch derivatives by incorporating an alkaline catalyst (e.g., sodium hydroxide) into an aqueous granular starch slurry in an amount sufficient to promote the etherification reaction between the starch material and an alkylene oxide reactant while at the same time avoiding swelling of the starch to a non-filterable condition. Moreover, the use of alkaline materials such as sodium hydroxide, potassium hydroxide, etc. as a catalyst in other granular starch derivatization reactions and/or for other granular starch treatment purposes (e.g., fat and/or protein removal) is also known in the art. As a means of avoiding unacceptbale swelling or pasting of the granular starch material by the alkaline catalyst, it has been common practice to employ salt swelling inhibitors such as, for example, sodium chloride and sodium sulfate.

In U.S. Pat. No. 3,632,803 to Hjermstad et al. (issued Jan. 4, 1972), it is disclosed that the previously practiced method of adding the alkali solution or alkali-salt solution to the surface of the granular starch slurry (or to the agitator vortex) in an agitated reaction vessel, even when done with the aid of salt swelling inhibitors and at a rate of addition sufficiently slow to avoid localized starch gelatinization, nonetheless results in non-uniform granular starch activation which, in turn, can apparently result in undesired gelatinization or solubilization of the more highly activated starch granules during subsequent etherification of the activated granular starch slurry with monofunctional etherifying agents or during subsequent acid thinning of the etherified starch product. As a solution to such problem, the indicated Hjermstad et al. patent proposed an improved process which involved preactivating the granular starch material by admixing an aqueous slurry thereof with the aqueous alkali solution (or with an aqueous alkali/salt solution) under turbulent flow conditions in an in-line mixer external to the batch reactor to be used for ultimately carrying out the etherification reaction of interest.

In carrying out the above-described improved process, it appears that Hjermstad et al. contemplated that the aqueous alkali or aqueous alkali/salt solution to be admixed with the starch slurry would generally correspond to that which was conventionally employed for addition directly into an agitated batch of the aqueous granular starch slurry and that said aqueous alkali solution would therefore be of relatively limited or dilute alkali concentration (e.g., about 5 weight percent or less in the case of sodium hydroxide on a total aqueous alkali solution weight basis) and would typically contain substantial amounts (e.g., about 20 weight percent on a total aqueous alkali/salt solution weight basis) of conventional salt swelling inhibitors such as sodium chloride, sodium sulfate, etc.,

SUMMARY OF THE INVENTION

It has now been discovered that even highly concentrated aqueous alkali solutions can be admixed with aqueous slurries of granular starch material without pasting or swelling said granular starch material to an unacceptable degree (and that such can be accomplished without the use of substantial amounts of salt swelling inhibitors) when the mixing of the slurry and the concentrated aqueous alkali solution is accomplished using an in-line mixer of sufficient intensity to completely and homogeneously mix such materials within a time period of less than one second.

On the basis of the foregoing discovery, the present invention in one aspect is a method for admixing a concentrated aqueous alkaline solution with an aqueuous slurry of granular starch material without pasting said granular starch material, said method being conducted by introducing a metered stream of an alkaline aqueous solution containing, on a total solution weight basis, at least about 10 weight percent of a water soluble alkaline reagent into a flowing stream of the aqueous slurry of granular starch material at or near the inlet of an intensive, in-line mixer which is capable of completely and homogeneously mixing said streams within a time period of less than 1 second, the relative flow rates of said streams being such that the equilibrium alkaline reagent content of the resulting granular starch slurry/aqueous alkaline solution mixture is (and remains during the course of the entire mixing process) sufficiently low to avoid gelatinization of the granular starch material.

The fact that the foregoing method facilitates the mixing of aqueous granular starch slurries with concentrated aqueous alkaline solutions containing as much as 25, 35 and even 50 weight percent of strongly alkaline materials such as alkali metal or alkaline earth metal hydroxides (especially sodium hydroxide) without pasting any significant quantity of the granular starch material and without adversely impacting upon the filterability thereof is considered to be particularly surprising since the critical gelatinization point for granular starch materials in the presence of various alkaline materials is documented as being relatively low and since alkali-induced starch gelatinization is widely recognized as being a very rapidly occurring phenomenon. See in this regard, for example, the article by Harry W. Leach entitled "Gelatinization of Starch in Caustic Alkali", Adhesives Age, September 1962, pages 20 and 21. In said article, it is disclosed that the critical gelatinization conditions for corn starch in various aqueous alkaline solutions is as follows:

CORN STARCH

| | CRITICAL ALKALI CONCENTRATIONS | |
|---|---|---|
| ALKALI | % ALKALI ADSORBED BY STARCH | % FREE ALKALI IN SOLUTION |
| Caustic Soda (NaOH) | 1.6 | 0.31 |
| Caustic Potash (KOH) | 3.9 | 0.67 |
| Barium Hydroxide | 6.4 | 0.16 |
| NaOH in 12% solution of NaCl | 4.0 | 0.2 |
| NaOH in 14% solution | 3.7 | 0.2 |

|  | CRITICAL ALKALI CONCENTRATIONS | |
|---|---|---|
| ALKALI | % ALKALI ADSORBED BY STARCH | % FREE ALKALI IN SOLUTION |
| of Na$_2$SO$_4$ |  |  |

The indicated article also discloses that the critical gelatinization conditions for potato starch is as follows:

POTATO STARCH

|  | CRITICAL ALKALI CONCENTRATION | |
|---|---|---|
| ALKALI | % ALKALI ADSORBED BY STARCH | % FREE ALKALI IN SOLUTION |
| NaOH | 1.3 | 0.23 |
| KOH | 1.9 | 0.32 |
| Ba(OH)$_2$ | 6.0 | 0.18 |

Thus, it can be seen on the basis of the foregoing information that the critical alkali concentration for 30 and 40 weight percent starch solids aqueous corn starch slurries on a starch dry solids basis (d.s.b.) would be as follows:

CORN STARCH

|  | CRITICAL ALKALI CONCENTRATION IN WEIGHT PERCENT ON A DRY STARCH SOLIDS BASIS | |
|---|---|---|
| ALKALI | 30% STARCH SLURRY | 40% STARCH SLURRY |
| NaOH | 2.3 | 2.1 |
| KOH | 5.5 | 4.9 |
| Ba(OH)$_2$ | 6.8 | 6.6 |
| NaOH in 12% solution of NaCL | 4.5 | 4.3 |
| NaOH in 14% solution of Na$_2$SO$_4$ | 4.2 | 4.0 |

Similarly, it can be seen that for 30 and 40 weight percent potato starch slurries the critical alkali concentration on a dry starch solids weight basis would be as follows:

POTATO STARCH

|  | CRITICAL ALKALI CONCENTRATION IN WEIGHT PERCENT ON A DRY STARCH SOLIDS BASIS | |
|---|---|---|
| ALKALI | 30% STARCH SLURRY | 40% STARCH SLURRY |
| NaOH | 1.8 | 1.6 |
| KOH | 2.6 | 2.4 |
| Ba(OH)$_2$ | 6.4 | 6.3 |

Since all of the foregoing critical alkali concentrations translate or correspond to alkali concentrations which are for the indicated 30 and 40 percent starch slurries well below 5 weight percent on a starch slurry aqueous medium only weight basis and since a finite period of time is required for mixing and dilution of the separately added aqueous alkali solution within and into the aqueous starch slurry, it is believed to be quite surprising that concentrated alkaline solutions containing in excess of 10 weight percent (and especially 25 weight percent or more) and up to as much as 35 to 45 or 50 weight percent alkali can be directly added to aqueous granular starch slurries in accordance with the present invention without localized pasting of the starch material and thus without causing the starch slurry to become unfilterable.

A particular and noteworthy advantage of the present invention is that, by virtue of being able to add highly concentrated alkaline solutions to previously made or pre-existing starch slurries of a given starch solids content, dilution of such slurries to lower starch solids levels is minimized and the capacity (on a starch product dry solids basis) of a reaction vessel of a given fixed volume is the thereby maximized.

DETAILED DESCRIPTION OF THE INVENTION

As has been indicated, the treatment method hereof is applicable to granular starch materials and permits the admixing of aqueous slurries thereof with relatively concentrated aqueous alkaline solutions without pasting said granular starch material and without destroying the filterable character thereof. Granular starch materials to which the present invention is applicable include those derived from a wide variety of plant sources such as, for example, corn, potato, wheat, rice, waxy maize, tapioca, etc.

Typically, the indicated granular starch slurries will have a granular starch material content in the range of from about 20 to about 40 (preferably from about 30 to about 40 and more preferably from about 35 to about 40) weight percent on a total slurry weight basis at the time that they are admixed with (i.e., just prior to being admixed with) the concentrated aqueous alkali solution of concern.

The alkaline reagent of the aforementioned concentrated aqueous alkali solutions can suitably be any water soluble alkali metal or alkaline earth metal oxide, hydroxide, carbonate or phosphate; ammonium hydroxide; quaternary ammonium hydroxides; and the like. Preferably, said alkaline reagent will be an alkali metal or alkaline earth metal hydroxide, especially sodium hydroxide or potassium hydroxide.

The concentration of the indicated alkaline component within the subject aqueous alkali solution at the time of the mixing thereof with the aqueous granular starch slurry will typically be at least about 10 weight percent on a total aqueous alkaline solution weight basis. Preferably, the concentration of said alkaline ingredient within such solution will be within the range of from about 10 to about 50 (more preferably from about 20 to about 50 and most preferably from about 25 to about 50) weight percent on a total aqueous alkaline solution weight basis.

As has been noted above, it is a distinct and surprising characteristic and advantage of the present invention that highly concentrated aqueous alkaline solutions (e.g., containing 25, 35 and even 50 weight percent of strongly alkaline materials such as sodium hydroxide, potassium hydroxide, etc.) can be satisfactorily incorporated into and admixed with the above-described aqueous granular starch slurries without localized pasting of the granular starch material (and without destroying the filterability of said starch slurries) during the mixing process and, further, that such can be accomplished without the necessary inclusion of the conventionally employed salt swelling inhibitors. Naturally, however, it is permissible to optionally include such inhibitors in connection with the practice of the present invention and, when so used, they can typically be employed in an amount ranging from about 0 to about 15 (preferably from about 0 to about 10 and more preferably from about 0 to about 5) weight percent based upon the total weight of the aqueous medium in which the starch is suspended before the mixing of the starch slurry of concern with the concentrated aqueous alkaline solution.

Salt swelling inhibotors suitable for optional use herein include any of those conventionally employed within the practice of the various prior art granular starch derivatization and/or treatment processes. As such, said salt swelling inhibitors thus include alkali metal chlorides such as sodium chloride, potassium chloride and lithium chloride; alkali metal sulfates such as sodium sulfate; alkali metal acetates; alkali metal nitrates; and the like.

In admixing the flowing stream of aqueous granular starch slurry with the metered stream of concentrated aqueous alkaline solution within the in-line mixer, it is important to control the relative flow rate of such streams such that the equilibrium concentration of alkaline reagent within the resulting mixture stream as it exits the in-line mixer (i.e., the alkaline reagent concentration following complete and homogeneous mixing within the in-line mixer) remains, at all times during the mixing process, sufficiently low to avoid pasting of the granular starch material. By way of example (and as has been noted above), the critical gelatinization alkali concentration for a 40 weight percent starch solids aqueous corn starch slurry in the absence of swelling inhibitor salts is about 2.1, 4.0, and 6.6 weight percent on a dry starch solids basis, respectively, for sodium hydroxide, potassium hydroxide, and barium hydroxide. As further examples, the critical gelatinization alkali concentration for a 40 weight percent starch solids aqueous potato starch slurry in the absence of swelling inhibitor salts is about 1.6, 2.4, and 6.3 weight percent on a dry starch solids basis, respectively, for sodium hydroxide, potassium hydroxide, and barium hydroxide.

As a general rule, the ratio of the volumetric flow rate of the starch slurry stream to that of the aqueous alkaline solution stream will be in the range of from about 35:1 to about 100:1 when the aqueous starch slurry contains from 30 to 40 weight percent of dry starch solids on a total slurry weight basis and when the aqueous alkaline solution contains from about 25 to about 50 weight percent of an alkali metal or alkaline earth metal hydroxide on a total aqueous alkaline solution weight basis.

In controlling the relative flow rates in a suitable fashion to satisfy the foregoing equilibrium, post-mixing alkali concentration criterion, it is both convenient and preferred to utilize feedback-controlled, automated flow measuremet and flow control apparatus and instrumentation in order to detect and adjust (or compensate) for any unintended or unavoidable deviations or fluctuations in the flow rate of either of the two streams (i.e., the aqueous granular starch stream and the concentrated aqueous alkali solution stream) and to thereby ensure that the critical gelatinization alkali concentration is not reached or exceeded within the admixed aqueous alkaline solution/aqueous granular starch slurry composition at any time during the mixing/treatment operation of concern. Naturally, such automated flow measurement and control is well within the capability of today's sophisticated state-of-the art, computer assisted apparatus and instrumentation and within the capability of the normally skilled chemical process engineering professionals.

As has been noted above, a key feature of the present invention resides in the use of an in-line mixing apparatus which accomplishes the complete and homogeneous mixing of the aqueous granular starch slurry stream and the concentrated aqueous alkali solution stream within a time period of less than one second. Oftentimes, and particularly when the more highly concentrated aqueous alkali solutions are employed (e.g., those containing from about 25 or 35 to about 50 weight percent of the alkaline material on a total solution weight basis) and/or when relatively more alkali-sensitive granular starch materials (e.g., potato starch) are to be treated in accordance herewith, it is preferable to employ an even more intensive in-line mixing apparatus which is capable of completely and homogeneously admixing the two streams of concern within a mixer residence time of less than about 0.5 second (especially about 0.2 second or less and most preferably in about 0.1 second or less.

The particular type or specific style of in-line mixer employed herein is not particularly critical. The mixer chosen for use should, however, provide at the conditions of use hereunder complete, homogeneous and uniform mixing of the subject granular starch slurry and aqueous alkali streams within the maximum mixing time period specified above and should serve to uniformly dilute the all increments or portions of the concentrated aqueous alkali solution within the mixer with the aqueous starch slurry to a level below the starch material's critical alkali-induced gelatinization concentration before any significant amount of alkali-induced starch granule-damage (e.g., gelatinization or substantial irreversible swelling) occurs by virtue of transient contact thereof with undiluted portions of the concentrated aqueous alkaline solution.

Specific examples of various types of in-line mixers suitable for use herein include the various styles and designs of static mixers (e.g., which typically operate on the principle of sequentially channeling or dividing the flowing stream therein into a plurality of discrete portions or increments; subsequently recombining same and thereafter repeating the dividing and recombining operation several times within downstream portions of the mixing apparatus); motor driven in-line mixing devices such as the so-called "pin mixers", etc.; jet or venturi type mixers; and the like. In addition, the desired in-line mixing can also be accomplished within the pump (e.g., gear pumps, centrifugal pumps, impeller pumps, etc.) used to transport the aqueous granular starch slurry of interest. However, special care must be taken in these latter instances to ensure that unmixed (or poorly or slowly mixed) "dead zones" are not present within such apparatus. Otherwise, dilution of the concentrated aqueous alkali solution in a sufficiently uniform and rapid fashion to avoid localized starch gelatinization or damage during mixing is not likely to be satisfactorily obtained.

The temperature at which the above-described mixing operation is conducted is not particularly critical except of course that it will not be chosen to be in excess of the gelatinization temperature of the granular starch material involved. As a general rule, said mixing operation will typically be conducted at a temperature in the range of from about 20to about 55(preferably from about 25 to about 50 and most preferably from about 30 to about 45) °C.

The alkaline solution/granular starch slurry mixture resulting from the foregoing mixing process can subsequently be further handled, processed, derivatized, etc. in any conventional fashion as may be desired in a given instance. Thus, for example, when the original purpose or reason for treating the granular starch material with the aqueous alkaline solution is simply defat or deflavor same, then the resulting treated starch slurry can be subjected to one or more filtering and washing sequences and can subsequently be recovered in dry granular form.

On the other hand, when the purpose of the granular starch/alkaline solution treatment is to activate or pre-activate the starch material for a subsequent derivatization reaction (e.g., etherification with etherifying agents such as ethylene oxide, propylene oxide, methyl chloride, ethyl chloride, dimethyl sulfate, chloroacetic acid, etc.) then the resulting treated starch slurry can be conveniently transferred to and collected in a conventional agitated batch reactor and the desired derivatization reaction can then be conducted in the desired conventional fashion, taking into appropriate account, of course, that the alkaline catalyst ingredient has already been incorporated into the granular starch slurry during conveyance thereof into said batch reactor.

The present invention is further illustrated and understood by reference to the following example thereof.

EXAMPLE

In this example, a granular common corn starch is dispersed in water to form an aqueous slurry thereof at a temperature of 100° F. (37.8° C.), said slurry containing about 36.7 weight percent starch on a total slurry weight basis. The resulting starch slurry is admixed with a concentrated aqueous caustic solution containing 25 weight percent sodium hydroxide on a total caustic solution weight basis by pumping said starch slurry through a Kenics Model ½-10-331-5 static mixer at a flow rate of about 9.5 gallons per minute (31.8 pounds of starch dry solids per minute) while injecting the concentrated aqueous caustic solution into the inlet of said static mixer at a flow rate of 0.25 gallons per minute (0.63 pounds of sodium hydroxide per minute). No swelling inhibitor salts are used and the equilibrium sodium hydroxide content of the starch slurry after mixing is about 2 weight percent on a starch dry solids weight basis. The residence time of the combined starch slurry and caustic solution stream in the static mixer is 0.05 seconds and the Reynolds number of the combined streams at the inlet line of the static mixer is 2840.

The resulting caustic-containing aqueous starch slurry is not pasted, contains no visible "fisheyes" and remains in an easily filterable condition containing no significant amount of swollen or damaged granules.

While the present invention has been described and illustrated by reference to certain specific embodiments and explans thereof, such is not to be understood or interpreted as in any way limiting or detracting from the scope of the instantly claimed invention.

What is claimed is:

1. A method for admixing a concentrated aqueous alkaline solution with an aqueous slurry of granular starch material without pasting said granular starch material, said method being conducted by introducing a metered stream of an alkaline aqueous solution containing, on a total aqueous alkaline solution weight basis, at least about 10 weight percent of a water soluble alkaline reagent into a flowing stream of the aqueous slurry of granular starch material at or near the inlet of an intensive, in-line mixer which is capable of completely and homogeneously mixing said streams within a time period of less than 1 second, the relative flow rates of said streams being such that the equilibrium alkaline reagent content of the resulting granular starch slurry/aqueous alkaline solution mixture is sufficiently low to avoid gelatinization of the granular starch material.

2. The method of claim 1 wherein the aqueous alkaline solution contains, on a total aqueous alkaline solution weight basis, from about 10 to about 50 weight percent of an alkali metal or alkaline earth metal hydroxide.

3. The method of claim 2 wherein the alkali metal or alkaline earth metal hydroxide is sodium hydroxide.

4. The method of claim 1 wherein the intensive, in-line mixer completely and homogeneously mixes the aqueous alkaline solution and aqueous granular starch slurry streams in less than 0.5 seconds.

5. The method of claim 1 wherein the intensive, in-line mixer completely and homogeneously mixes the aqueous alkaline solution and the aqueous granular starch slurry streams in less than 0.2 seconds.

6. The method of claim 1 wherein the aqueous granular starch slurry contains from about 30 to about 40 weight percent of granular corn starch on a total aqueous starch slurry weight basis.

7. The method of claim 6 wherein the alkaline reagent is sodium hydroxide and wherein the sodium hydroxide content of the resulting starch slurry/aqueous alkaline solution mixture is less than 2.1 weight percent on a dry starch solids weight basis.

8. The method of claim 6 wherein the alkaline reagent is potassium hydroxide and wherein the potassium hydroxide content of the resulting starch slurry/aqueous alkaline solution mixture is less than 4.9 weight percent on a dry starch solids weight basis.

9. The method of claim 6 wherein the alkaline reagent is barium hydroxide and wherein the barium hydroxide content of the resulting starch slurry/aqueous alkaline solution mixture is less than 6.6 weight percent on a dry starch solids weight basis.

10. The method of claim 1 wherein the aqueous granular starch slurry contains from about 30 to about 40 weight percent of granular potato starch on a total aqueous starch slurry weight basis.

11. The method of claim 10 wherein the alkaline reagent is sodium hydroxide and wherein the sodium hydroxide content of the resulting starch slurry/aqueous alkaline solution mixture is less than 1.6 weight percent on a dry starch solids weight basis.

12. The method of claim 10 wherein the alkaline reagent is potassium hydroxide and wherein the potassium hydroxide content of the resulting starch slurry/aqueous alkaline solution mixture is less than 2.4 weight percent on a dry starch solids weight basis.

13. The method of claim 10 wherein the alkaline reagent is barium hydroxide and wherein the barium hydroxide content of the resulting starch slurry/aqueous alkaline solution mixture is less than 6.3 weight percent on a dry starch solids weight basis.

14. The method of claim 1 wherein the intensive, in-line mixer is a static mixer.

15. The method of claim 1 wherein the aqueous granular starch slurry contains from about 30 to about 40 weight percent of dry granular starch solids on a total starch slurry weight basis.

16. The method of claim 15 wherein the aqueous alkaline solution contains from about 25 to about 50 weight percent of an alkali metal or alkaline earth metal hydroxide on a total alkaline solution weight basis and wherein the ratio of the volumetric flow rate of the starch slurry stream to that of the aqueous alkaline stream is from about 35:1 to about 100:1.

17. The method of claim 16 wherein no salt swelling inhibitor salts are employed within the aqueous starch slurry stream nor within the aqueous alkaline stream.

* * * * *